US007894979B2

(12) United States Patent
Mück

(10) Patent No.: US 7,894,979 B2
(45) Date of Patent: Feb. 22, 2011

(54) METHODS FOR DETERMINING TURNING RATES IN A ROAD NETWORK

(75) Inventor: Jürgen Mück, München (DE)

(73) Assignee: Siemens Aktiengesellschaft, Munich (DE)

( * ) Notice: Subject to any disclaimer, the term of this patent is extended or adjusted under 35 U.S.C. 154(b) by 913 days.

(21) Appl. No.: 11/629,796

(22) PCT Filed: May 24, 2006

(86) PCT No.: PCT/EP2006/062571

§ 371 (c)(1), (2), (4) Date: Dec. 15, 2006

(87) PCT Pub. No.: WO2006/128819

PCT Pub. Date: Dec. 7, 2006

(65) Prior Publication Data

US 2008/0069000 A1 Mar. 20, 2008

(30) Foreign Application Priority Data

May 31, 2005 (DE) ....................... 10 2005 024 953

(51) Int. Cl.
*G06F 19/00* (2006.01)
*G06G 7/70* (2006.01)
*G06G 7/76* (2006.01)
*G06G 1/00* (2006.01)

(52) U.S. Cl. ............................ 701/117; 701/1; 701/118

(58) Field of Classification Search ..................... 701/1, 701/117, 118; 370/229, 230, 231, 232, 233, 370/234, 235; 340/474, 475, 476, 909, 916, 340/934, 937, 995.13; 404/1; 342/454
See application file for complete search history.

(56) References Cited

U.S. PATENT DOCUMENTS 3,663,937 A * 5/1972 Bolner ....................... 340/937

(Continued)

FOREIGN PATENT DOCUMENTS

DE 101 36 646 A1 2/2003

(Continued)

OTHER PUBLICATIONS

Tobias Henninger, "Ein Verfahren zur gekoppelten Schätzung von Kantenbelastungen, Abbiegequoten and Störungen in Stadtstraßennetzen" (A method for combined estimation of edge loadings, turning rates and traffic incidents in urban road networks), published in the series of publications of the Automation Systems Working Group of the Technische Universität Hamburg-Harburg, Issue 20, May 2001.

*Primary Examiner*—Khoi Tran
*Assistant Examiner*—Jaime Figueroa

(57) ABSTRACT

Methods for determining turning rates in a road network are provided. Traffic volumes are recorded at measurement cross-sections at predefinable measuring intervals. For at least one forward-related subnetwork of the road network in which measurement cross-sections are taken into account at an exit and at entries of the subnetwork, a model equation is formulated in which the exit traffic volume is set as the weighted sum of the entry traffic volumes and the weighting factors correspond to the forward-related turning rates which specify in each case the portion of an entry traffic volume flowing out through the exit taken into account, and wherein the forward-related turning rates are calculated on the basis of the model equation using a mathematical estimation method.

16 Claims, 2 Drawing Sheets

U.S. PATENT DOCUMENTS

| | | | | |
|---|---|---|---|---|
| 3,920,967 | A * | 11/1975 | Martin et al. | 701/118 |
| 5,459,665 | A * | 10/1995 | Hikita et al. | 701/118 |
| 5,530,441 | A * | 6/1996 | Takatou et al. | 340/937 |
| 5,696,502 | A * | 12/1997 | Busch et al. | 340/905 |
| 5,861,820 | A * | 1/1999 | Kerner et al. | 340/934 |
| 5,921,701 | A * | 7/1999 | Clayton | 404/1 |
| 5,999,877 | A * | 12/1999 | Takahashi et al. | 701/117 |
| 6,522,970 | B2 * | 2/2003 | Kerner | 701/117 |
| 6,587,779 | B1 * | 7/2003 | Kerner et al. | 701/117 |
| 6,813,555 | B1 * | 11/2004 | Kerner | 701/117 |
| 2004/0088392 | A1 * | 5/2004 | Barrett et al. | 709/223 |
| 2006/0071815 | A1 * | 4/2006 | Parsons | 340/916 |

FOREIGN PATENT DOCUMENTS

| | | | |
|---|---|---|---|
| EP | 0 293 724 | A1 | 12/1988 |
| EP | 0 681 277 | A2 | 11/1995 |
| EP | 0 889 454 | A2 | 1/1999 |

* cited by examiner

METHODS FOR DETERMINING TURNING RATES IN A ROAD NETWORK

CROSS REFERENCE TO RELATED APPLICATIONS

This application is the US National Stage of International Application No. PCT/EP2006/062571, filed May 24, 2006 and claims the benefit thereof. The International Application claims the benefits of German application No. 10 2005 024 953.1 DE filed May 31, 2005, both of the applications are incorporated by reference herein in their entirety.

FIELD OF INVENTION

The invention relates to a method for determining turning rates in a road network as well as applications of same in various traffic control methods.

BACKGROUND OF INVENTION

A basic task of traffic control systems in cities is online determination of the traffic flows in the road network in order to obtain information about the traffic situation and optimally control the connected subsystems. This involves systems for determining the traffic situation on a wide-area basis, but also for precisely determining traffic conditions in subnetworks and optimizing associated traffic signal installations. An essential task of these methods is to determine the traffic flows in the road network, calculation of the turning flows at intersections being a central algorithmic problem.

A method of the abovementioned type is known from the dissertation "Ein Verfahren zur gekoppelten Schätzung von Kantenbelastungen, Abbiegequoten and Störungen in Stadtstraβennetzen" (A method for combined estimation of edge loadings, turning rates and traffic incidents in urban road networks), published in the series of publications of the automation systems working group of the Technische Universitat Hamburg-Harburg, Issue 20, May 2001. The estimator is supplied at two-second intervals with all the measured traffic volumes flowing into and out of an intersection. For turning rate estimation a purely dynamic method is used which is also classifiable among the recursive methods. A highly time-resolved mode of calculation automatically results in subdivision into phase group oriented subsystems. For calculating the turning rates, the variations in the entry and exit flows are taken into account in a time interval k compared to the preceding time interval k−1. This known method is characterized by exacting requirements in terms of data provision—e.g. aggregation of measurement data in intervals of two to three seconds—and complex network modeling. In some cases quite specific positions for the measurement cross-sections are also required. For the model equation used as the basis for the estimation method, as a time reference either the same measuring interval is used for the left- and right-hand side or the exit traffic volume at measuring interval k is calculated from the entry traffic volumes of the preceding time interval k−1. This method suffers from the disadvantage that the estimation result is strongly dependent on the travel times between the measurement cross-sections of the subnetwork in question.

SUMMARY OF INVENTION

An object of the invention is therefore to provide a method of the kind mentioned in the introduction that is robust in respect of the travel times between the measurement cross-sections and nevertheless operates quickly and accurately.

This object is achieved according to the invention by a generic method wherein, in the weighted sum for the exit traffic volume of a given measuring interval, the entry traffic volumes of a plurality of preceding measuring intervals are taken into account, a forward-related turning rate to be determined being produced as the sum of the corresponding turning rates of the measuring intervals taken into account in the model equation. Due to the generalized time reference for the model equation, the method according to the invention for determining the turning rates has been shown to be robust in respect of the travel times between the measurement cross-sections and therefore robust in respect of the size of the subnetworks considered. It is fast and has an accuracy hitherto unknown in practice. Finally, in contrast to the previously used methods, the method according to the invention requires no calibration.

In an advantageous embodiment of the method according to the invention a model equation is formulated for at least one backward-related subnetwork of the road network for which measurement cross-sections at an entry and at exits of the subnetwork are taken into account. In this model equation, the entry traffic volume is set as the weighted sum of the exit traffic volumes and the weighting factors correspond to the backward-related turning rates specifying the portion of an exit traffic volume that has flowed in through the entry taken into account, the turning rates being calculated by means of a mathematical estimation method on the basis of the model equation, the exit traffic volumes of a plurality of subsequent measuring intervals being taken into account in the weighted sum for the entry traffic volume of a given measuring interval, and a backward-related turning rate to be determined being produced as the sum of the corresponding turning rates of the measuring intervals taken into account in the model equation. The estimation of timewise forward- and backward-related turning rates makes the method according to the invention even more robust and accurate.

For the mathematical estimation method, an extended, in particular nonlinear Kalman filter is preferably used, as this is a stochastic system with noise effects. The stochastic parameters of the extended Kalman filter can be estimated in advance from the statistical analyses of the data. At the same time the filter is robust in respect of parameterization and only requires the current measured values. The nonlinear Kalman filter is considerably more accurate, requires less computing time and fewer sets of data than correlation analyses. In addition, the proposed filter requires less calibration effort than heuristic methods of Operations Research.

In a particular embodiment of the method according to the invention, the estimation process is interrupted if a traffic overload is detected at a measurement cross-section. This ensures that the turning rates estimated prior to the overload are retained, so that misestimates due to the queuing vehicles are prevented, i.e. these constitute a buffer which would destroy the correlation between inbound and outbound traffic streams.

In a preferred application of the invention for a method for determining turning rates at an intersection of the road network, forward-related and/or backward-related subnetworks around the intersection are considered for which measurement cross-sections in the entry and exit roads of the intersection are taken into account, the turning rates being determined according to the above-described method. The turning rates can be advantageously estimated by suitably selecting the subnetworks around a possibly traffic-signal controlled junction.

In another application of the invention for a method for determining origin-destination traffic flows of a subnetwork, the turning rates for the entries and exits of the subnetwork are determined according to the abovementioned method, measurement cross-sections only being taken into account at the edge of the subnetwork but not inside it, so that the origin-destination traffic flows for said subnetwork are calculated from the turning rates determined and the traffic volumes recorded. This ensures that, for each exit measurement cross-section, all the relevant entry measurement cross-sections are incorporated in the model equation; similarly, in the case of a backward-related subnetwork, all the relevant exit measurement cross-sections for an entry measurement cross-section are incorporated. This enables direct dynamic estimation of the origin-destination flows to be performed in subnetworks of limited size.

The number of measuring intervals taken into account is preferably increased as the size of the subnetwork considered increases. If the measurement cross-sections are close together, it suffices to take a smaller number of preceding or following measuring intervals into account. If the travel times between the entry and exit measurement cross-sections increase as the size of the subnetwork considered increases, a larger number of measuring intervals must also be taken into account.

The measuring intervals to be taken into account are preferably lengthened as the size of the subnetwork considered increases. Increasing the aggregation intervals to e.g. five minutes reduces the estimation process interference due to noise.

In another advantageous application of the invention to a method for determining the traffic volume at a roadway point in a road network, turning rates determined according to the abovementioned method are provided for a subnetwork of the road network, one entry or exit of which has the roadway point and the other entries and/or exits of which have measurement cross-sections, and the traffic volume at the roadway point of the one entry or exit is calculated from the turning rates provided and the traffic volumes of the other entries and/or exits recorded at the measurement cross-sections. In the case of known turning rates for a subnetwork, traffic volumes in its entries or exits can be determined therefrom where no measurement is available.

The traffic volume determined for the roadway point is preferably used as a substitute value for a defective or failed measurement cross-section.

In another preferred application of the invention to a method for determining the number of vehicles within a roadway section at whose first end point the traffic volume is recorded at a measurement cross-section and at whose second end point no measurement cross-section is disposed, the traffic volume at the second end point, and from it the number of vehicles in the roadway section, is determined according to the above-described method by time integration of the difference between the traffic volume flowing into the roadway section and the traffic volume flowing away from same. By means of this balancing approach, for example, queue lengths in approaches to traffic signal controlled intersections can be determined even if only one measurement cross-section is present in the entry at one of the two end points of the roadway section in question.

In likewise advantageous application of the invention to a method for determining correction factors for turning rates determined according to the above-described method, a homogeneous equation system for the correction factors to be determined is first formulated from the vehicle conservation of the actual forward- and backward-related turning rates, an optimization problem is then obtained from the homogeneous equation system together with a constraint eliminating the trivial solution, the correction factors emerging as a solution of the optimization problem. By this means, for example, constant percentage traffic volume recording errors possibly resulting from the particular location but also due to defective internal calibration of detectors can be compensated.

The correction factors determined are preferably divided by their median value, it being assumed that in a subnetwork less than half of the measurement cross-sections count too many vehicles and less than half count too few vehicles, so that the median value of the list of correction values determined can be used as a reference value. Due to the abovementioned correction division, this then has the value one.

In a preferred embodiment of this application, a road subnetwork under consideration is subdivided into island networks, each island network having measurement cross-sections only at its edge, and correction factors are determined for the island networks. By means of this suitable breakdown into island networks, on the one hand the computational overhead for optimization is reduced and, on the other, leveling-out effects of the estimated correction factors which occur in networks in which a large number of measuring points in both directions have further measurement cross-sections are avoided.

It is advantageously checked here whether the correction factors determined lie within a predefinable value range. If they are outside the predefinable value range, such a large discrepancy between estimated and measured variables is present that an error message can be issued in this way.

In an advantageous embodiment of this application, for solving the optimization problem a parameter is calculated whose value is used as a measure of the estimation quality of the turning rates. For an island network, this parameter ideally tends toward zero if the turning rates have been exactly estimated and neither vehicle losses nor vehicle additions occur between the measurement cross-sections and all the measuring errors are proportional in nature.

An error message is preferably issued if the value of the parameter exceeds a predefinable threshold. This is an indicator of imprecisely estimated turning rates, unrecorded entry and exit traffic volumes or measuring errors of a non-proportional kind which occur, for example, if not all the relevant entry and exit traffic volumes in the subnetwork are measured.

In another preferred embodiment of the described application of the invention, two correction factors are determined for each measurement cross-section shared by two adjacent island networks, the correction factors of one island network in each case being scaled such that the correction factors of common measurement cross-sections approximate to one another. By means of this further optimization step, the ratio of the correction factors within each island network remains unchanged, but common estimation errors between the island networks are compensated.

The traffic volumes recorded at the measurement cross-sections and the turning rates determined by estimation are preferably calibrated by means of the correction factors determined.

BRIEF DESCRIPTION OF THE DRAWINGS

Further advantages of the method according to the invention and of its preferred applications will emerge from a specific exemplary embodiment which will now be described in greater detail with reference to the accompanying schematics, in which.

DETAILED DESCRIPTION OF INVENTION

Figure 1:
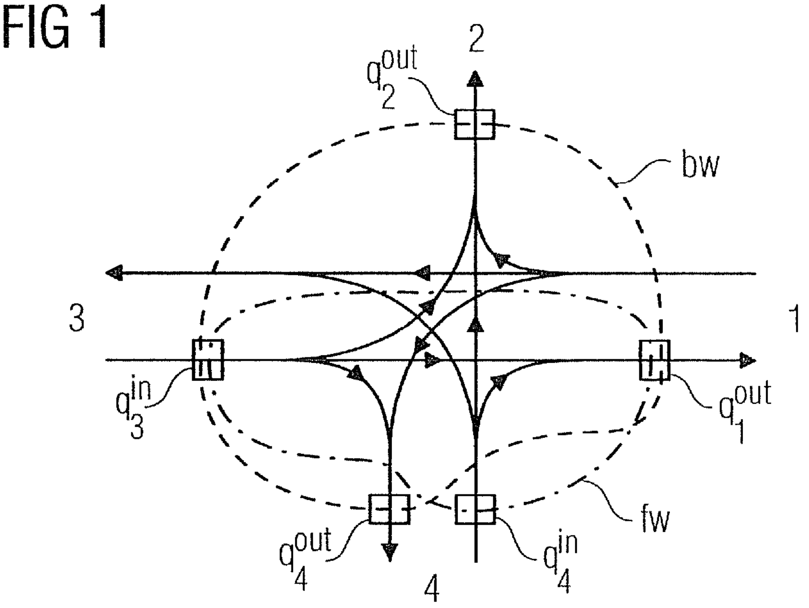
FIG. 1 shows subnetworks of a network section with intersection.

FIG. 1 shows a section of a road network, such as an urban road network, in which the turning rates of the traffic streams are to be determined for traffic control purposes. It comprises an intersection having four arms i (i=1, . . . , 4) with entries and exits to/from the intersection, arm 2 in the example shown comprising only one exit. In the example described the roadway from entry 1 to exit 3 includes no measurement cross-sections. At all the other entries and exits of the intersection there are measurement cross-sections with detectors for recording entry traffic volumes $q_i^{in}(n)$ and exit traffic volumes $q_i^{out}(n)$ at predefinable measuring intervals n. A basic element of the method according to the invention for dynamic estimation of turning rates is a suitable breakdown of the network section into subnetworks. FIG. 1 shows a first subnetwork fw whose network edge is shown as a dash-dotted line and which includes measurement cross-sections in the exit 1 and in the relevant entries 3 and 4. The entries 3 and 4 are relevant as it is here that traffic sub-streams enter the subnetwork fw which flow out of the subnetwork fw through exit 1.

Figure 2:
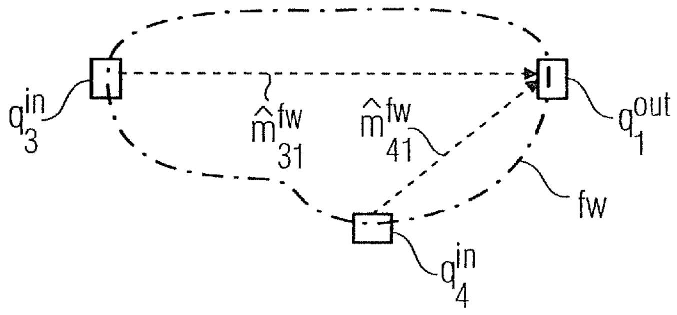
FIG. 2 shows the forward-related subnetwork from FIG. 1 with turning relations.

In FIG. 2 the subnetwork fw from FIG. 1 is shown with the associated turning relations. The turning rate $\hat{m}_{31}^{fw}(k)$ specifies the portion of the traffic volume $q_3^{in}(k)$ measured on entry 3 which flows out of the subnetwork fw through exit 1 and therefore contributes to the traffic volume $q_1^{out}(k)$ measured there. This applies analogously to the turning rate $\hat{m}_{41}^{fw}(k)$ in relation to the entry traffic volume $q_4^{in}(k)$. The subnetwork fw therefore models the turning relations on a timewise forward-related basis. In the case of slowly changing traffic action, for a predefined measuring interval k the exit traffic volume $q_1^{out}(k)$ can be modeled as the weighted sum of the entry traffic volumes $q_3^{in}(k)$ and $q_4^{in}(k)$, the weighting factors corresponding to the relevant turning rates $\hat{m}_{31}^{fw}(k)$ and $\hat{m}_{41}^{fw}(k)$.Generally, for r entries i relevant to an exit j this can be written as:

$$q_j^{out}(k) = \sum_{i=1}^{r} \hat{m}_{ij}^{fw}(k) \cdot q_i^{in}(k)$$

On the basis of this model equation, the turning rates $\hat{m}_{ij}^{fw}(k)$ can be determined by means of a mathematical estimation method. However, the estimation method is based on a generalized time reference. A plurality of previous measuring intervals n=k−1, k−2, . . . are taken into account in addition to the currently considered measuring interval k. For the forward-related model equation in which a total of z measuring intervals are included, we therefore get:

$$q_j^{out}(k) = \sum_{l=1}^{z} \sum_{i=1}^{r} m_{ij}^{fw}(k-l+1) \cdot q_i^{in}(k-l+1)$$

The turning rates $\hat{m}_{ij}^{fw}(k)$ to be estimated are produced as the sum of the turning rates $m_{ij}^{fw}(k-1+1)$ over the measuring intervals 1=1, . . . , z taken into account:

$$\hat{m}_{ij}^{fw}(k) = \sum_{l=1}^{z} m_{ij}^{fw}(k-l+1), \quad i = 1, \ldots, r$$

This approach makes the method according to the invention robust in respect of travel times between the measurement cross-sections, with high accuracy and sufficient rapidity.

Figure 3:
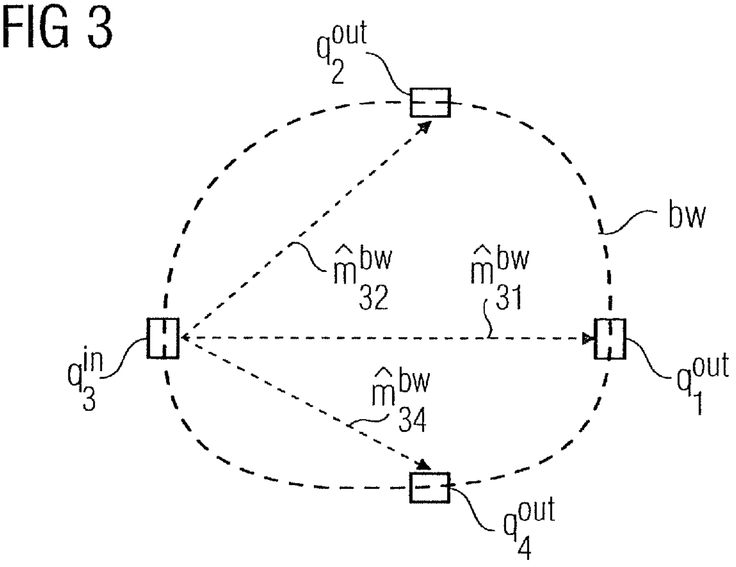
FIG. 3 shows the backward-related subnetwork from FIG. 1 with turning relations.

This approach can also be advantageously applied according to the invention to timewise backward-related subnetworks bw (backward). FIG. 1 shows such a subnetwork bw whose network edge is shown as a dashed line and which comprises measurement cross-sections in the entry 3 and in the relevant exits 1, 2 and 4. The exits 1, 2 and 4 are relevant since it is there that traffic subflows exit the subnetwork bw which have flowed into the subnetwork bw through the entry 3. This subnetwork bw with the associated turning relations is shown in FIG. 3. The turning rate $\hat{m}_{32}^{bw}(k)$ specifies the portion of the traffic volume $q_2^{out}(k)$ measured in exit 2 which has flowed into the subnetwork bw via entry 3 and therefore contributes to the traffic volume $q_3^{in}(k)$ measured there. This applies analogously to the turning rates $\hat{m}_{31}^{bw}(k)$ and $\hat{m}_{34}^{bw}(k)$ in relation to the exit traffic volumes $q_1^{out}(k)$ and $q_4^{out}(k)$ respectively. The subnetwork bw therefore models the turning relations on a timewise forward-related basis. Generally, for s exits i relevant to an entry j, taking z measuring intervals into account, the weighted sum can again be written as:

$$q_j^{in}(k) = \sum_{l=1}^{z} \sum_{i=1}^{s} m_{ij}^{bw}(k+l-1) \cdot q_i^{out}(k+l-1)$$

The turning rates $\hat{m}_{ij}^{bw}(k)$ to be estimated are produced analogously as sums of the turning rates $m_{ij}^{bw}(k+1-1)$ over the measuring intervals 1=, . . . , z taken into account:

$$\hat{m}_{ij}^{bw}(k) = \sum_{i=1}^{z} m_{ij}^{bw}(k+l-1), \; j = 1, \ldots, s$$

According to the invention, an extended Kalman filter is used as a mathematical estimation method for estimating the turning rates.

If the measurement cross-sections are close together, e.g. one or two intervening traffic signal installations, a lower number of measuring intervals to be taken into account suffices, empirically three or four.

If the general approach with z>3 is used, the model equation can also be applied in large subnetworks whose detectors are only evaluated at the network edge and not inside the network. It must only be ensured that, in the forward-related case, all the entry measurement cross-sections relevant to an exit measurement cross-section of a subnetwork are included or that, in the backward-related case, all the exit measurement cross-sections relevant to an entry measurement cross-section are included.

In this way, direct dynamic estimation of origin-destination flows can be performed in subnetworks of limited size. However, the parameters of the Kalman filter such as error variances must be adapted accordingly and the estimation quality is not as high as for closely adjacent measurement cross-sections. It is advisable here to increase the measuring intervals, i.e. the aggregation periods, to e.g. five minutes in order to reduce estimation process interference due to noise.

The estimation process is advantageously interrupted if an overload is detected on one of the measurement cross-sections used for a subnetwork.

Occasionally a balancing approach is used for determining queue lengths in approaches to traffic signal installations. This determines the number of vehicles, i.e. the queue length, in one of the entries by integrating the traffic volumes at the end points of the roadway section over time. If only one measurement cross-section is located at one of the two end points—which is generally the case in practice—the traffic volume at the other end point can be estimated via turning rates determined according to the invention.

A further advantage of using the method according to the invention will now be described for the case that a measurement cross-section is located at the entry to a roadway section, whereas the traffic volume at the exit from the roadway section is estimated via turning rates, as there is no measurement cross-section on this roadway section. The abovementioned model equations are characterized in that the turning rates of the entries and exits are estimated in relation to the exit and entry traffic volume respectively. If the traffic volume measurements exhibit proportional errors, these are compensated in the turning rates. The entry traffic volumes calculated therefrom are consistent with the measured exit traffic volume. In this way the balancing quality is considerably increased without the need for specific calibrations for each roadway section balanced.

For the description which follows, the estimation results will be written in matrix notation. If we consider a measuring interval k (no longer shown below), the forward-related estimations can be summarized in matrix notation. The formula describes how the exit traffic volumes can be deduced from the entry traffic volumes on the basis of the forward-related turning rates:

$$q^{out} = M^{fw} \cdot q^{in}$$

In this vector equation, $q^{in}$ and $q^{out}$ are column vectors whose components represent the entry traffic volumes $q_i^{in}$ and exit traffic volumes $q_i^{out}$ respectively of all the measurement cross-sections of the entries and exits of the intersection arms i, whereas $M^{fw}$ means an (n×n) matrix whose elements are the turning rates $m_{ij}^{fw}$.

Accordingly, the backward-related propagation can be formulated as follows:

$$q^{in} = M^{bw} \cdot q^{out}$$

In this case the column vectors $q^{in}$ and $q^{out}$ include all the measurement cross-sections in the same sequence, even if there is no route relation between components $q_i$ of the right-hand side and $q_j$ of the left-hand side of the equation. For the corresponding element of the matrix M, $m_{ij}=0$ applies in this case.

It can generally be assumed that detectors of the measurement cross-sections record the actual traffic volumes only with a certain degree of accuracy. This may be due to their location, e.g. crossing of two lanes by vehicles, but also to a defective internal calibration process in which the measurements are subject to drift, as frequently occurs in practice over the course of time.

Assuming, in a first approximation, a constant percentage deviation $f_i=1\pm\Delta$, the relationship between actual traffic volume $q_i$ and measured traffic volume $\hat{q}_i$ can be formulated as follows:

$$q_i = f_i \cdot \hat{q}_i, i=1, \ldots, n$$

If $\hat{m}_{ij}^{fw}$ and $\hat{m}_{ij}^{bw}$ are the estimated turning rates, this yields respectively:

$$\hat{q}^{out} = \hat{M}^{fw} \cdot \hat{q}^{in} \text{ and } \hat{q}^{in} = \hat{M}^{bw} \cdot \hat{q}^{out}$$

The correction factors can be $f_i$ can be subsumed in a diagonal matrix F:

$$F = \text{diag}(f_1, \ldots, f_i, \ldots, f_n)$$

Under the physically useful assumption that the diagonal elements $f_i$ are non-zero, the inverse $F^{-1}$ of F exists which likewise has diagonal form $$F^{-1} = \text{diag}(f_1^{-1}, \ldots, f_1^{-1}, \ldots, f_n^{-1},$$

so that consequently:

$$q^{out} = (F \cdot \hat{M}^{fw} \cdot F^{-1} \cdot q^{in}) \text{ and } q^{in} = (F \cdot \hat{M}^{bw} \cdot F^{-1} \cdot q^{out})$$

The relation between the real and estimated matrices of the turning rates can be deduced from the comparison of the relations for the actual and estimated traffic volumes:

$$M^{fw} = F \cdot \hat{M}^{fw} \cdot F^{-1} \text{ and } M^{bw} = F \cdot \hat{M}^{bw} \cdot F^{-1}$$

For the elements of the estimated matrices, this yields $$m_{ij}^{fw} = \frac{f_j}{f_i} \cdot \hat{m}_{ij}^{fw} \text{ and } m_{ij}^{bw} = \frac{f_j}{f_i} \cdot \hat{m}_{ij}^{bw}$$

For the real turning relations, assuming vehicle conservation considered on a forward-related basis at the entry measurement cross-section i and on a backward-related basis at the exit measurement cross-section i, we get respectively $$\sum_{j=1}^{n} m_{ij}^{fw} = 1 \text{ and } \sum_{j=1}^{n} m_{ij}^{bw} = 1$$

which directly yields the determination equations for the elements of the matrix F with the correction factors:

$$\sum_{j=1}^{n} f_j \cdot \hat{m}_{ij}^{fw} - f_i = 0 \text{ and } \sum_{j=1}^{n} f_j \cdot m_{ij}^{bw} - f_i = 0$$

for all the columns i in $\hat{M}^{fw}$ and $\hat{M}^{bw}$ respectively which do not consist only of zeros.

From the $n_{in}$ entry and $n_{out}$ exit measurement cross-sections there is produced an overdetermined homogeneous equation system for the $f_i$ with $n_{in}+N_{out}\leqq n$ equations. The limiting case $n_{in}+n_{out}=n$ is obtained when each individual measurement cross-section has an adjacent measurement cross-section in one direction only. This case arises in practice when measurement cross-sections are only present at the network edge. The simplest case is that of an individual traffic signal installation in which all the relevant entries and exits are recorded.

In order to eliminate the physically useless trivial solution F=0, the following requirement is attached to the solution:

$$(f_1-1)^2=0$$

If the assumption applies that deviations result in proportionally errored measurements only, this creates no limitation, as for each solution F of the homogeneous equation system, $F=\lambda\cdot F'$ also constitutes a solution.

The last equations finally yield the formulation of a suitable nonlinear optimization problem, according to which the parameter $$P=\frac{w_1\cdot\sum_{i=1}^{n}\left(s_i^{fw}\right)^2+w_1\cdot\sum_{i=1}^{n}\left(s_i^{bw}\right)^2+w_2\cdot(f_1-1)^2}{n}$$

with $$s_i^{fw}=\sum_{j=1}^{n}f_j\cdot\hat{m}_{ij}^{fw}-f_i\ \text{ for }\ \sum_{j=1}^{n}\hat{m}_{ij}^{fw}\neq 0,\text{ otherwise } s_i^{fw}=0$$

$$s_i^{bw}=\sum_{j=1}^{n}f_j\cdot\hat{m}_{ij}^{bw}-f_i\ \text{ for }\ \sum_{j=1}^{n}\hat{m}_{ij}^{bw}\neq 0,\text{ otherwise } s_i^{bw}=0$$

must be minimized, $w_1$ and $w_2$ representing selectable weightings.

As the first factor $f_1$ was arbitrarily selected, although it is possibly actually not equal to 1, finally another correction can be made to the determined solution F'. If it is assumed that in a network less than half of all the measurement cross-sections estimate too many vehicles ($f_i>1$) and less than half of all the measurement cross-sections estimate too few vehicles ($f_i<1$), the median value of F can be used as a reference, as this must be 1. To solve the problem we can then use:

$$F=\lambda-F'\ \text{ with }\ \lambda=\frac{1}{\text{median}(F)}$$

The optimization problem formulated can be formally applied to a network as a whole. However, this has two disadvantages: on the one hand the computational overhead for the optimization increases disproportionately with the number of measurement cross-sections. On the other hand, the fact that in the network many measurement cross-sections have further measurement cross-sections in both directions results in leveling-out effects of the estimated correction factors $f_i$.

Figure 4:
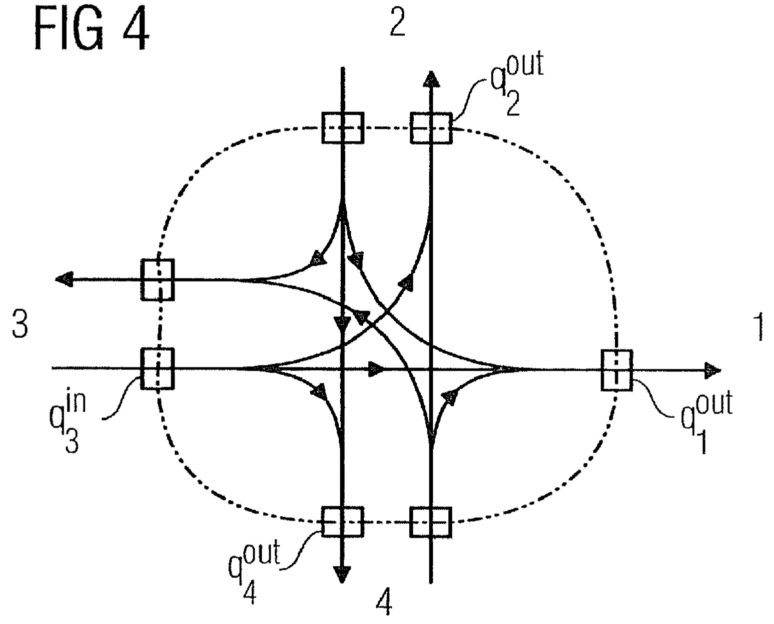
FIG. 4 shows an island network around an intersection and FIG. 5 schematically illustrates the time characteristic of turning rates estimated according to the invention for the island network from FIG. 4.

To overcome this disadvantage, the method can be refined by suitably breaking down the network. It has been found advantageous to apply it to subnetworks which are defined such that, of each point within such a network, only those measuring points that are directly accessible via network edges are part of that subnetwork. Each such subnetwork effectively constitutes an island network with entries and exits to/from the remaining network. It subsumes all the forward- and backward-related subnetworks having the same entry and exit measurement cross-sections respectively. FIG. 4 shows such an island network which is generally produced around the traffic signal installation with the usual detector configuration at intersections. It has measurement cross-sections only at the network edge which is indicated in FIG. 4 by a dash-double-dotted line.

This eliminates the above-described disadvantages. At the same time, the parameter P resulting from the solution of the optimization problem for an island network provides further indications of any detector malfunctions: the value P of the solution of the optimization problem for an island network ideally tends toward zero if the turning rates have been precisely estimated and no vehicle losses (sinks) or increases (sources) occur between the measurement cross-sections, and all the measuring errors are proportional in nature. If a value considerably greater than zero is produced for P, e.g. two, this indicates imprecisely estimated turning rates, unrecorded entries and exits or measuring errors other than those of a proportional kind. Such an error typically occurs if not all the traffic flows in the relevant entries and exits of such a subnetwork are recorded or measurement cross-sections have been incorrectly assigned to the routes e.g. due to incorrect configuration/wiring.

Figure 5:
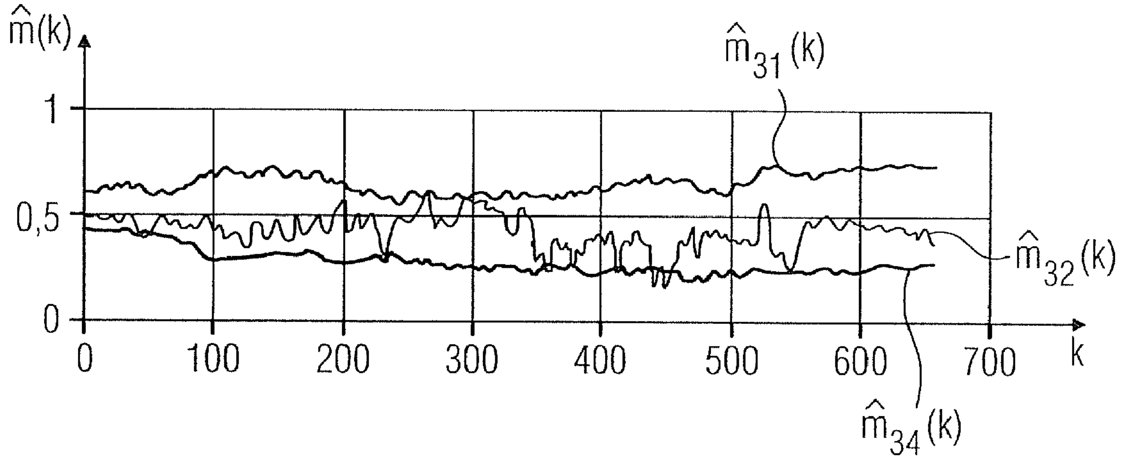

FIG. 5 plots the inventively determined backward-related turning rates $\hat{m}_{ij}(k)$ for the traffic streams between intersection arm 3 and intersection arms 4, 1 and 2. For this purpose a list with correction factors $f_i$ and the value of the parameter P is output (not shown).

With this approach, two values for the measuring error are estimated at all the measurement cross-sections between island networks. In a final compensation process, these can be pairwise matched to one another via a further optimization step by multiplying all the measuring errors $f_i$ of all the subnetworks by subnetwork-specific correction factors. These correction factors leave the ratio of the $f_i$ within each subnetwork unchanged, but result in an adjustment of common estimation errors between the subnetworks.

Finally all the measured traffic volumes can be calibrated via $$q_i^{kal}=f_i\cdot\hat{q}_i$$

and all the turning rates via $$m_{ij}^{kal}=\frac{f_j}{f_i}\cdot\hat{m}_{ij}$$

which qualitatively improves the estimation of the traffic situation.

Another application of the results is the formation of substitute values if detectors or entire measurement cross-sections have failed. Such failures are either already detected in the equipment hardware and passed on, or can be detected by simple plausibility checks. In this case substitute values can be simply formed on the basis of the measured and calibrated traffic volumes and turning rates of the surrounding measurement cross-sections. This constitutes a considerable quality step change compared to known methods which in the simplest case replace missing measurements merely by permanently preconfigured time-dependent values or—in a very complex and time-consuming way—determine them via previously recorded, day-type-specific profiles and the current point in time.

The turning rates estimated using the method described have an accuracy which is sufficient both for traffic situation estimation and for further use in adaptive network control methods, and which far exceed the estimation quality of conventional, assignment-based methods.

The estimation of the correction factors $f_i$ for all the measurement cross-sections allows on the one hand online correction of the turning rates and traffic volume counts. The method for network-related substitute value formation which it allows does not require profiles or preconfigured default counts and will function even in the event of several closely adjacent detector failures, as in this case substitutions can also be performed recursively.

On the other hand, the consistency check provides valuable indications for detector network maintenance. Corresponding reporting mechanisms enable a city's maintenance service to repair defective detectors more quickly and efficiently, and also provide considerable cost savings.

The invention claimed is:

1. A method for determining turning rates in a road network, comprising:

measuring traffic volumes at plurality of measurement cross-sections at a plurality predefined measuring intervals;

dividing the road network at least partially into subnetworks with entries and at least one exit;

considering at least one subnetwork as a forward-related network;

formulating a model equation for the forward-related subnetwork in which measurement cross-sections are based upon the at least one exit and the entries of the subnetwork;

setting an exit traffic volume as a weighted sum of entry traffic volumes, wherein a weighting factor corresponds to forward-related turning rates, the weighting factor specifying the portion of an entry traffic volume flowing out through the at least one exit;

calculating the forward-related turning rates based upon the model equation;

accounting the entry traffic volumes of the plurality of past measuring intervals in the weighted sum for the exit traffic volume of a predefined measuring interval; and determining a forward-related turning rate based upon a sum of corresponding turning rates of the measuring intervals, wherein the model equation is based upon a mathematical estimation method, and wherein an extended Kalman filter is used in the mathematical estimation method.

2. The method as claimed in claim 1, wherein at least one subnetwork is a backward-related subnetwork having measurement cross sections at an entry and at exits, a model equation is formulated in which the entry traffic volume is set as the weighted sum of exit traffic volumes and the weighting factors correspond to a backward-related turning rates specifying in each case the portion of an exit traffic volume that has flowed in through the entry taken into account, turning rates are calculated by a mathematical estimation method based upon the model equation, the weighted sum for the entry traffic volume of a given measuring interval is based upon the exit traffic volumes of a plurality of subsequent measuring intervals, and the backward-related turning rate is based upon the sum of the corresponding turning rates of the measuring intervals.

3. The method as claimed in claim 1, wherein the estimation process is interrupted when a traffic overload is detected at a measurement cross-section.

4. A method for dete mining turning rates at an intersection of a road network, comprising:

measuring traffic volumes at a plurality of measurement cross-sections at a plurality of predefined measuring intervals;

dividing the road network at least partially into subnetworks with entries and at least one exit, wherein at least one part of the subnetwork is at least a part of the intersection;

formulating a model equation for the subnetwork based upon measurement cross-sections at the exit and at the entries of the subnetwork;

setting an exit traffic volume as a weighted sum of entry traffic volumes, wherein a plurality of weighting factors correspond to a plurality of turning rates, the turning rates specifying the portion of an entry traffic volume flowing out through the at least one exit;

calculating the turning rates based upon the model equation which is based upon a mathematical estimation method;

accounting the entry traffic volumes of a plurality of preceding measuring intervals in the weighted sum for the exit traffic volume of a predefined measuring interval; and determining a turning rate based upon a sum of corresponding turning rates of the measuring intervals, wherein the model equation is based upon a mathematical estimation method, and wherein an extended Kalman filter is used in the mathematical estimation method.

5. The method as claimed in claim 4, wherein the subnetwork is a forward related network and the turnings are forward related.

6. The method as claimed in claim 4, wherein the subnetwork is a backward related network.

7. The method as claimed in claim 4, wherein a traffic stream of a subnetwork between an origin and a destination is determined, the traffic stream is calculated by only using measurement cross-sections at the edge of the subnetwork, and the traffic stream is calculated based upon the determined turning rates and recorded traffic volumes.

8. The method as claimed in claim 4, wherein the number of measuring intervals increases with the size of the subnetwork.

9. The method as claimed in claim 4, wherein the measuring intervals are lengthened with an increased size of the subnetwork.

10. A method for determining the traffic volume on a roadway point of a road network, based upon a method for deteimining turning rates in a road network, comprising:

deteimining turning rates by measuring traffic volumes at a plurality of measurement cross-sections at a plurality of predefined measuring intervals, dividing the road network at least partially into subnetworks with entries and at least one exit, considering at least one subnetwork as a forward-related network, formulating a model equation for the forward-related subnetwork in which measurement cross-sections are based upon the exit and the entries of the subnetwork, setting an exit traffic volume as a weighted sum of entry traffic volumes, wherein weighting factors correspond to forward-related turning rates, the weighting factor specifying the portion of an entry traffic volume flowing out through the at least one exit, calculating the forward-related turning rates based upon the model equation, accounting the entry traffic volumes of the plurality of past measuring intervals in the weighted sum for the exit traffic volume of a predefined measuring interval, and determining a forward-related turning rate based upon a sum of corresponding turning rates of the measuring intervals;

providing turning rates for a subnetwork of the road network, wherein first access point is based upon a cross-section of the roadway and a second access point is based upon the measurement cross-sections; and calculating the traffic volume at the cross-section of the roadway at an access point based upon the provided turning rates and the traffic volumes of other access points at the measurement cross-sections, wherein the model equation is based upon a mathematical estimation method, and wherein an extended Kalman filter is used in the mathematical estimation method.

11. The method as claimed in claim 10, wherein the access point is an entry.

12. The method as claimed in claim 10, wherein the access point is an exit.

13. The method as claimed in claim 10, wherein the traffic volume determined for the roadway point is used as a substitute value for a defective or failed measurement cross-section.

14. The method as claimed in claim 10, wherein the traffic volume is used for determining a number of vehicles within a roadway section, the traffic volume is recorded at the first end point at a measurement cross-section, the traffic volume is determined at a second end point based upon the number of vehicles in the roadway section, based upon a time integration of the difference between the traffic volume flowing into the roadway section and the traffic volume flowing away from same.

15. The method as claimed in claim 10, wherein a correction factor is used to correct the turning rates.

16. The method as claimed in claim 15, wherein the correction factor is determined by a homogeneous equation system based upon the vehicle conservation of the actual forward- and backward-related turning rates.

* * * * *